UNITED STATES PATENT OFFICE.

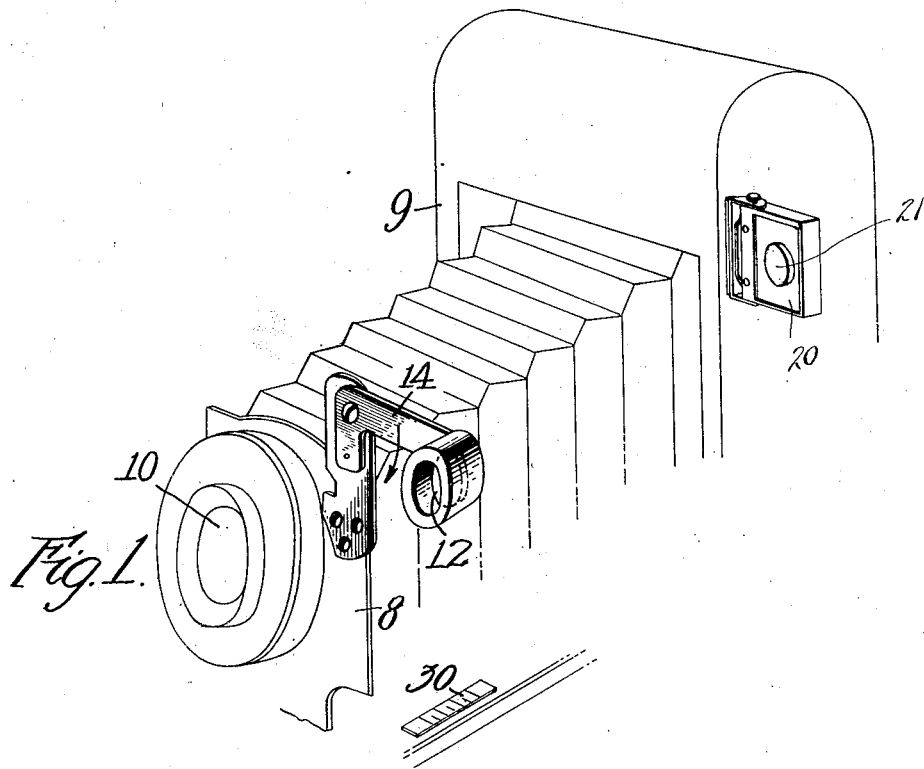
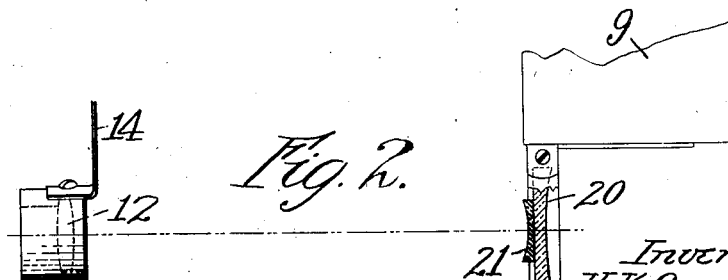

HERBERT K. CUMMINGS, OF WEST BOYLSTON, AND LOUIS THOMPSON, OF WORCESTER, MASSACHUSETTS.

FOCUSING DEVICE FOR CAMERAS.

1,258,398.     Specification of Letters Patent.     Patented Mar. 5, 1918.

Application filed September 26, 1916. Serial No. 122,301.

*To all whom it may concern:*

Be it known that we, HERBERT K. CUMMINGS and LOUIS THOMPSON, citizens of the United States, said CUMMINGS residing at West Boylston and said THOMPSON residing at Worcester, both in the county of Worcester and State of Massachusetts, have invented a new and useful Focusing Device for Cameras, of which the following is a specification.

This invention relates to a device for focusing photographic cameras, and the principal objects thereof are to provide a construction of the simplest possible character for this purpose which under ordinary circumstances will not require an additional bellows, which can be used for interior work where the light is too weak for accurate ground glass focusing, the ground glass ordinarily employed being dispensed with. It also involves combinations of parts whereby the definition of the object will be extremely sharp. The invention also involves the construction of this device in such a form that it can be combined with a view finder so that the observer will see the general composition of the picture with a section in the center enlarged and in focus when the camera is in focus. Further objects and advantages of the invention will appear hereinafter.

Reference is to be had to the accompanying drawings, in which—

Figure 1 is a perspective view of an ordinary camera showing one embodiment of this invention applied thereto; and

Fig. 2 is a plan.

The form shown is suitable for hand-cameras and all cameras using an objective of not too great focal length. It is shown here as applied to a camera having a camera lens 10 and sensitive film 11 as usual. In this case the focusing device comprises an objective 12 and an eye piece 21. The objective is shown supported by a pivoted arm 14 secured on the lens board 8 carrying the camera lens 10 and this objective is located in the plane or substantially in the plane of the camera lens and preferably is of the same focal length. The principal focus of the eye-piece is approximately in the plane of the film 11 within the camera. As the two objectives 10 and 12 move together in focusing, the operation of focusing the camera also focuses the telescope and vice versa. When the operator sees that the telescope is in focus on the object, he will know that the camera is also.

In case a negative eye-piece is used the virtual image viewed in focusing will be erect and the eye-piece nearer the objective than the real image formed in the camera. With a positive eye-piece, the image observed is inverted.

In the form shown a plano-concave lens 20 is shown pivotally attached to the side of the camera such as is ordinarily used in sighting the camera and composing the picture, and known as a view finder. In order to apply this invention to it the objective is used as stated above and a concave eye-piece 21 may be inserted at the center of the form of a plano-concave lens of sufficient size and power as shown. The focusing operation is obvious, but in looking into the large lens the observer sees the general composition of the picture, with a section of the center enlarged and in focus when the camera is in focus. In this way it constitutes a combined focusing attachment and composition glass or view finder.

We are aware of the fact that focusing devices have been provided in which a lens moved with the camera lens, but so far as we are aware they were not combined with a view finder and always were arranged to produce a real image on a ground glass or screen, which has less definition and is fainter than the enlarged virtual image seen in this case through an eye-piece. Consequently, those devices were not highly efficient for interior work or in any place where the light was weak and even in a strong light, a light excluding bellows was practically necessary.

It will be understood that the invention can be carried out in other ways without departing from the scope of the invention as expressed in the claims, therefore, we do not wish to be limited to all the details of construction herein shown and described, but what we do claim is:—

1. The combination with a camera casing, of a movable lens board therefor, an objective thereon with a focusing device having an objective movable with said lens board, and a plano-concave eye-piece located so as to have its principal focus substantially in the plane of the sensitive film within the camera, and a plano-concave lens larger than said eye-piece, said second objective, eye-piece and lens being in optical alinement.

2. The combination with a camera, of a plano-concave view finder, and a focusing device comprising an objective movable with the camera lens and an eye-piece fixed with respect to said view finder and so located relatively thereto that the operator can observe the object through both at once.

3. The combination with a camera, of a focusing device having an objective movable with the camera lens and an eye-piece located so as to have its principal focus substantially in the plane of the sensitive film within the camera, and a relatively large plano-concave lens, on which the eye-piece is located.

In testimony whereof we have hereunto affixed our signatures.

HERBERT K. CUMMINGS.
LOUIS THOMPSON.